US007648628B2

(12) United States Patent
Hoffjann et al.

(10) Patent No.: US 7,648,628 B2
(45) Date of Patent: Jan. 19, 2010

(54) WATER TREATMENT FOR AN AIRCRAFT

(75) Inventors: Claus Hoffjann, Hamburg (DE); Holger Brilsky, Hamburg (DE); Hans-Juergen Heinrich, Hamburg (DE)

(73) Assignee: Airbus Deutschland GmbH (DE)

( * ) Notice: Subject to any disclaimer, the term of this patent is extended or adjusted under 35 U.S.C. 154(b) by 606 days.

(21) Appl. No.: 11/146,701

(22) Filed: Jun. 7, 2005

(65) Prior Publication Data

US 2006/0011525 A1    Jan. 19, 2006

Related U.S. Application Data

(60) Provisional application No. 60/578,690, filed on Jun. 9, 2004.

(30) Foreign Application Priority Data

Jun. 9, 2004   (DE) .................. 10 2004 028 036

(51) Int. Cl.
    *B01D 35/02*    (2006.01)
    *H01M 8/06*     (2006.01)

(52) U.S. Cl. .............. 210/136; 210/167.3; 210/182; 210/172.1; 210/210; 210/257.1; 210/258; 210/259; 210/297; 210/369; 60/670

(58) Field of Classification Search .......... 210/136, 210/167.3, 182, 172.1, 210, 257.1, 258, 259, 210/297, 369; 60/670
See application file for complete search history.

(56) References Cited

U.S. PATENT DOCUMENTS 2,696,916 A * 12/1954 Peterson et al. ........... 210/236

| | | | |
|---|---|---|---|
| 4,871,452 A | 10/1989 | Kohler et al. | 210/167 |
| 4,871,542 A | 10/1989 | Vilhardt | 424/423 |
| 5,080,797 A | 1/1992 | Völkner | 210/652 |
| 6,143,185 A | 11/2000 | Tracy et al. | 210/744 |
| 6,887,602 B2 | 5/2005 | Fagley | |
| 6,936,238 B2 | 8/2005 | Sennoun et al. | |
| 7,036,314 B2 * | 5/2006 | Hoffjann et al. | 60/645 |
| 7,172,702 B2 * | 2/2007 | Hoffjann et al. | 210/652 |
| 2004/0040680 A1 | 3/2004 | Iwasaki | 162/135 |
| 2004/0060869 A1 | 4/2004 | Hoffjann et al. | |

FOREIGN PATENT DOCUMENTS

| DE | 102 16 361 A1 | 4/2003 |
|---|---|---|
| DE | 102 16 710 A1 | 4/2003 |
| DE | 10216709 A1 * | 4/2003 |
| DE | 103 16 709 A1 | 10/2003 |

(Continued)

OTHER PUBLICATIONS

European Search Report, dated Aug. 18, 2005, 3 pages.
Sekoulov, I., et al. "Investigation On Wastwater Reuse On Passenger Aircraft" (1991) Water Science and Technology, vol. 23:2199-2208.
German Examination Report in DE 10 2004 028 036.3, dated Jul. 10, 2008 (8 pages).

*Primary Examiner*—Terry K Cecil
(74) *Attorney, Agent, or Firm*—Ostrolenk Faber LLP

(57) ABSTRACT

Water represents an important resource in an aircraft. In modern aircraft, sufficient water reserves are carried along in designated tanks that are regularly refilled by ground personnel. One embodiment relates to a water treatment system for aircraft that may make it possible to treat a gray water/black water mixture accumulated on board of an aircraft during its operation in sufficient quantity and quality for use in a downstream reformer. This means that the water circuit within the aircraft is closed and costly water tanks are eliminated.

16 Claims, 3 Drawing Sheets

FOREIGN PATENT DOCUMENTS

Figure 1:
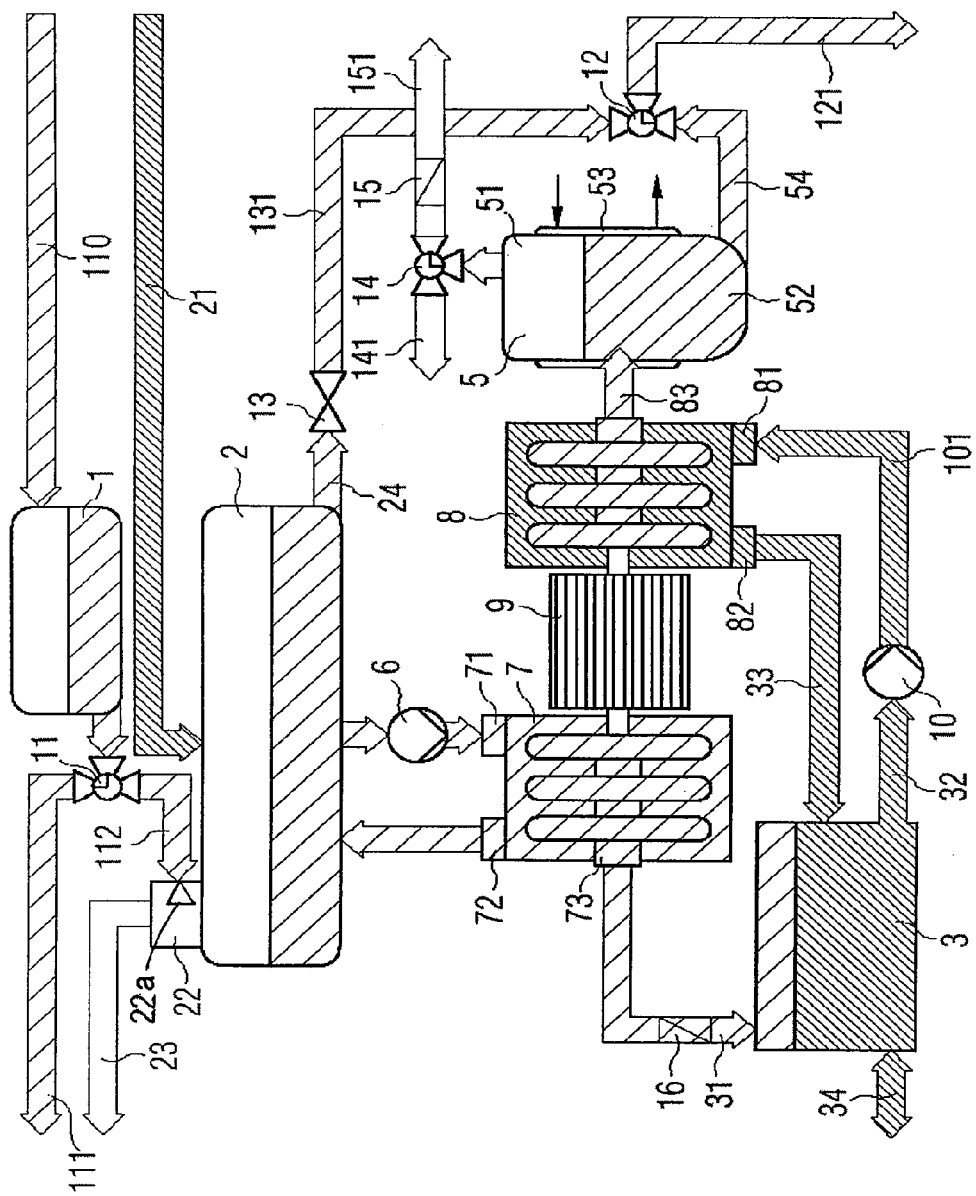

| | | |
|---|---|---|
| DE | 102 29 309 A1 | 1/2004 |
| DE | 103 38 240 A1 | 3/2004 |
| EP | 0 111 171 A2 | 11/1983 |
| EP | 1 354 856 A | 4/2003 |
| EP | 1 354 856 A1 | 10/2003 |
| WO | WO 2004/040680 A2 | 5/2004 |

* cited by examiner

WATER TREATMENT FOR AN AIRCRAFT

FIELD OF THE INVENTION

The present invention pertains to the water treatment for aircraft. The present invention specifically relates to a water treatment system for an aircraft, a method for treating water in an aircraft and an aircraft that comprises a corresponding water treatment system.

TECHNOLOGICAL BACKGROUND

In conventional aircraft, the gray water, i.e., all water from sinks and galleys (on-board kitchens), is discharged outboard via a so-called "drainmast" that consists of a heated outlet pipe on the underside of the fuselage. The black water, i.e., the waste water from the on-board toilets, is collected in so-called "wastetanks" or waste water collection tanks and ultimately disposed of on the ground.

Various methods for the treatment of waste water are known. There exist mechanical methods that, for example, utilize filters, chemical methods that utilize, for example, activated carbon or other chemical substances, e.g., disinfectants, and organic methods as they are used in bacteriological clarification stages. Known arrangements for treating waste water that are able, in particular, to produce an adequate quantity of water of sufficient quality for supplying a so-called reformer from gray water or even black water are large, heavy or do not operate sufficiently fast or efficiently for use in an aircraft.

SUMMARY OF THE INVENTION

According to an exemplary embodiment of the present invention, a water treatment system for an aircraft is provided that comprises a water supply arrangement for supplying gray water or black water, a water treatment arrangement for treating the supplied gray water or black water and a water delivery arrangement for delivering the treated gray water or black water, wherein the water delivered by the water delivery arrangement is suitable for use in a reformer.

Consequently, the gray water and the black water accumulated on board of an aircraft during its operation can be recycled in such a way that the treated water has a sufficient quality for use in an on-board reformer of e.g. a fuel cell.

In combination with a water generating system such as, for example, a fuel cell, this may make it possible to reduce the total quantity of water situated on board of an aircraft and consequently the weight such that fuel and cargo space may be saved.

According to another exemplary embodiment of the present invention, the water treatment arrangement comprises at least one stage that is selected from the group consisting of first stage, second stage and third stage, wherein the first stage is arranged for carrying out a first filtration of the supplied gray water or black water. The second stage is arranged for binding substances contained in the water to a first chemically active substance, and the third stage is arranged for carrying out a second filtration of the water.

The multi-stage design of the water treatment system according to the invention may allow an efficient and thorough treatment of gray water or black water. The first filtration process makes it possible, for example, to remove solids or sludge from the water mixture. If so required, other substances contained in the water, e.g., salts, phosphates and sulfates, can be bound to the first chemically active substance in the second stage, wherein this chemically active substance is subsequently removed from the water, for example, during the course of a second filtration process.

According to another exemplary embodiment of the present invention, the water treatment arrangement or the water delivery arrangement comprises an evaporator for evaporating water.

The evaporator may remove practically all substances remaining in the water and produces nearly deionized water, e.g., as required for a reforming process to be carried out upstream of a fuel cell. The evaporator may make it possible to retain all salts contained in the water such that clean water vapor or condensate can be delivered to a downstream reformer.

According to another exemplary embodiment of the present invention, the water vapor produced in the evaporator or condensate being created thereof, respectively, can either be discharged outboard via a first valve or delivered to a reformer via the first valve and an additional check valve.

In this case, it may be ensured that excess water vapor can be easily and safely discharged without creating an undesirable pressure increase in the system. For example, the additional check valve may prevent the reformer from subjecting the evaporator to an undesirable pressure (blowback of combustible mixtures).

According to another exemplary embodiment of the present invention, the waste materials can be discharged outboard from the evaporator via a second valve.

This may make it possible to regularly remove waste materials depositing in the water evaporator. The waste materials are removed from the evaporator, for example, by changing over the directional valve during normal waste servicing on the ground analogous to the removal of waste materials from the vacuum tank.

According to another exemplary embodiment of the present invention, the water delivery arrangement comprises a first waste water tank for gray water or black water, wherein the first waste water tank is realized in the form of a vacuum tank.

The vacuum tank may be connected to the sewage pipes of on-board toilets or the like such that the sewage is sucked into the vacuum tank by the negative pressure when the corresponding valve is opened.

According to another exemplary embodiment of the present invention, the water delivery arrangement also comprises a second waste water tank for gray water, a vacuum transport system and an outlet pipe, wherein the gray water stored in the second waste water tank can be selectively discharged from the second waste water tank into the first waste water tank by means of said vacuum transport system or discharged outboard via the outlet pipe.

In this embodiment, an intermediate tank for gray water is provided that can be used for supplying the vacuum tank. In addition, the outlet pipe makes it possible to selectively discharge the gray water stored in the collection tank outboard, e.g., if the capacity of the collection tank is reached or if unneeded water should be discharged outboard for weight reasons.

According to another exemplary embodiment of the present invention, a rotating disk filter arranged in the first stage makes it possible to at least partially separate the liquid contained in the supplied gray water or black water from the residues contained therein. The residues can be returned into a waste water tank of the water supply arrangement.

The rotating disk filter advantageously comprises a device for separating solids and residual liquid from a significant quantity of water contained in the gray water/black water mixture, wherein this device operates reliably, thoroughly and with adequate efficiency. According to this exemplary embodiment, the residues can be returned into the first waste water tank because the residual liquid still provides the filtered-out solids with a sufficient viscosity.

According to another exemplary embodiment of the present invention, the second stage comprises a collection tank, wherein a granulate of at least the first chemically active substance or a second chemically active substance can be admixed to the water in the collection tank in the second stage. In this case, the second chemically active substance comprises activated carbon.

The granulate or the first or second chemically active substance contained therein binds substances contained in the water, e.g., salts, phosphates or sulfates.

According to another exemplary embodiment of the present invention, the third stage comprises a second rotating disk filter and the outlet, wherein the water from the collection tank can be at least partially separated by means of the second rotating disk filter in the third stage, and wherein the water can be discharged via the outlet after having been at least partially separated. This may ensure a simple and efficient separation of the purified or pre-purified water from the first chemically active substance or the granulate, respectively.

Another exemplary embodiment of the present invention pertains to a method for treating water in an aircraft that comprises the following steps: supplying gray water or black water by means of a water supply arrangement, treating the supplied gray water or black water by means of a water treatment arrangement and delivering the treated gray water or black water by means of the water delivery arrangement. In this case, the water delivered by the water delivery arrangement is suitable for use in a reformer.

This method may make available an adequate quantity of water of the quality required for use in a reformer on board of an aircraft, namely by recycling the gray water as well as the black water accumulating on board of the aircraft during its operation in such a way that its quality after the treatment suffices for use in an on-board reformer. In combination with a water generating system, e.g., fuel cells, this makes it possible to effectively reduce the total quantity of water situated on board of an aircraft and consequently the weight such that fuel and cargo capacity are saved.

According to another exemplary embodiment of the present invention, the treatment comprises at least one of the following steps: first filtration of the supplied gray water or black water, binding substances contained in the water to a first chemically active substance, second filtration of the water and separating the water in an evaporator.

The multistage method according to the invention ensures a fast and high-quality purification or recycling of the gray water or black water accumulating on board of an aircraft during its operation.

The first filtration process makes it possible, for example, to remove solids or sludge from the water mixture. The binding step makes it possible, if so required, to bind other substances such as salts, phosphates and sulfates to the first chemically active substance and to remove these substances from the water in the second filtration process. Salts contained in the water are retained due to the evaporation such that clean water vapor or clean condensate can be supplied to a downstream reformer.

SHORT DESCRIPTION OF THE DRAWINGS

Preferred embodiments of the present invention are described below with reference to the figures.

Figure 1A:
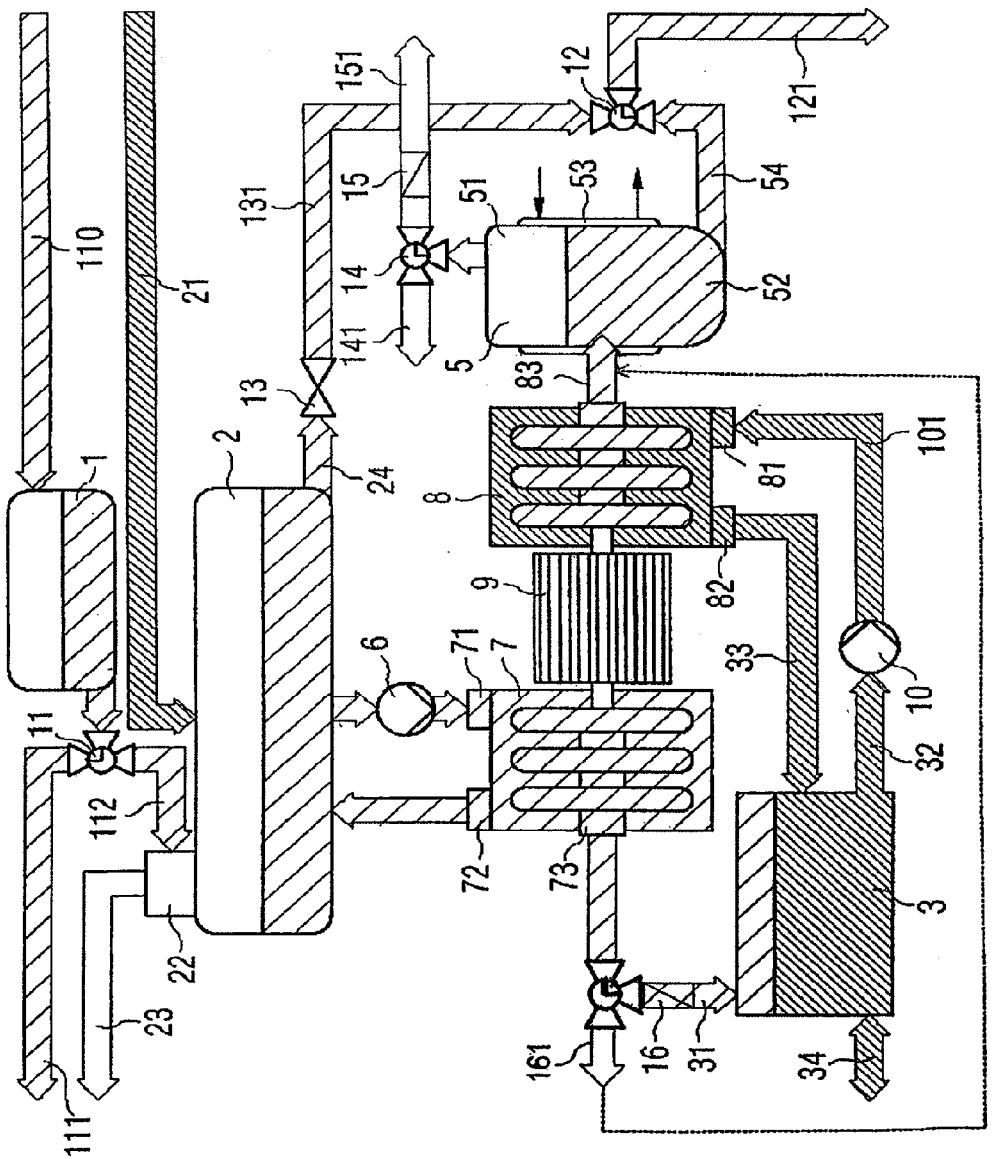
Figure 2:
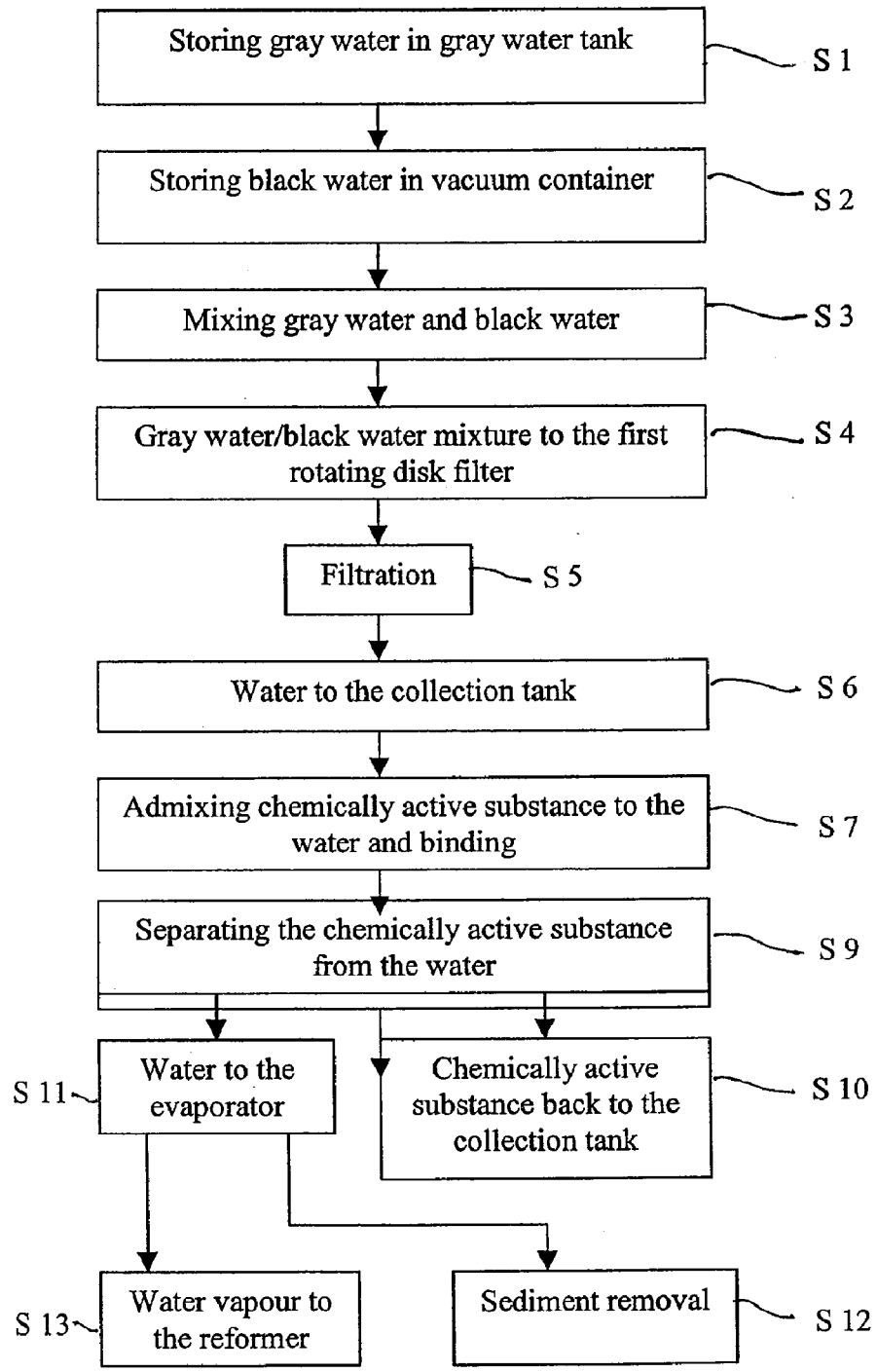

FIG. 1 shows a schematic representation of a first embodiment of a water treatment system according to the present invention, FIG. 1a shows a schematic representation of a second embodiment of a water treatment system according to the present invention, and FIG. 2 shows a flow chart of one embodiment of the method according to the present invention.

DETAILED DESCRIPTION OF THE
EXEMPLARY EMBODIMENTS

The water treatment system that is schematically illustrated in FIG. 1 comprises a vacuum tank or first waste water tank 2, a first rotating filter 7, a collection tank 3, a second rotating filter 8 and an evaporator 5.

The water treatment system shown in FIG. 1 is particularly suitable for installation in an aircraft or spacecraft. The integration of the water treatment system according to the invention into an aircraft or spacecraft makes it possible to ensure the water supply by effectively recycling the water, particularly in combination with a reformer and a fuel cell that is used as a water generating system.

Reformers serve for extracting hydrogen contained in hydrocarbons for use in fuel cells. In addition to the hydrocarbons (e.g., gasoline, diesel fuel, kerosene), water is frequently also required for this purpose, namely for obtaining a sufficient quantity of oxygen atoms that can combine with the carbon atoms contained in the hydrocarbon in order to form $CO$ or $CO_2$ in the reforming process, as well as for forming a sufficient quantity of free hydrogen molecules. The water required for this purpose needs to fulfill the strict requirements of the respective reforming method. In a reformer equipped with a catalyst, this requires water of high purity that is free of salts.

The water treatment system according to the invention makes available an adequate quantity of water of the required quality for use in reformer fuel cell systems on board of aircraft.

In the water treatment system according to the invention, the waste water accumulated on board of an aircraft during its operation, namely gray water and black water, are combined with one another and then treated for use in a reforming process. The waste water remaining in the "wastetank" needs to have a sufficiently low viscosity for being conventionally disposed of on the ground. In addition, excess quantities of water are discharged outboard for reasons of weight reduction in the water treatment system according to the invention. In this respect, the invention naturally fulfills the applicable requirements regarding the purity of the water being discharged and its harmlessness to persons on the ground.

The waste water accumulated on board of an aircraft during its operation in the form of gray water, for example, the waste water from sinks, is collected in the gray water tank 1 via gray water lines 110. The waste water accumulated on board of an aircraft during its operation in the form of black water, for example, the sewage from on-board toilets, is collected in the vacuum tank 2 via black water lines 21. The vacuum in the vacuum tank 2 is generated with the aid of a vacuum generator or a vacuum pump (not shown in FIG. 1) that is connected to vacuum tank via a vacuum line 23.

An effective and fast emptying of the on-board toilets can be achieved with the vacuum generated in the vacuum tank. A control valve 11 makes it possible to either discharge the gray water collected in the collection tank 1 outboard via a drainmast line 111 and a so-called drainmast (not shown in FIG. 1) or to deliver this gray water to the vacuum tank 2 for further use via the line 112 with a separator 22. The accumulated gray water from the collection tank 1 is mixed with the black water from the on-board water closets in the vacuum tank 2.

The gray/black water mixture is delivered to a first rotating filter 7 via the rotating filter inlet 71 with the aid of a pump 6. The separated solids flow back into the vacuum tank 2 together with the residual liquid via the line rotating filter outlet 72. This vacuum tank can be emptied on the ground via the line 24, the valve 13 and the line 131, as well as via the directional valve 12 and the line 121.

At this point, it should be noted that the valves of the water treatment system can be controlled automatically. In this context, it would be conceivable to utilize valves that are operated, in particular, electrically, hydraulically or pneumatically.

The vacuum tank can be emptied on the ground, for example, with the aid of an external suction system (not shown in FIG. 1).

The available water quantity is preferably controlled in three separate areas. First, the accumulated gray water quantity can be limited by discharging gray water in the direction of the drainmast 111 via the valve 11. Second, a quantitative buffering can be realized when utilizing the tank 3. Third, water vapor that is not needed by the reformer can be discharged outboard via the line 141 by briefly changing over the valve 14.

The separator 22 comprises one or more spray nozzles 22a that introduce the gray water into the separator and are used for removing deposits from the separator 22.

The liquid obtained in the rotating filter 7 is essentially free of solids, but still contains other substances depending on the filter design. Additional steps are required in order to separate these substances from the water. In this case, the liquid obtained in the rotating filter 7 is delivered, for example, to the collection tank 3 via the line 73, the check valve 16 and the supply line 31. A fine-grained granulate of a chemically active substance, e.g., activated carbon and zinc oxide, is situated in this tank 3. These two substances are able to bind certain substances contained in the liquid, e.g., organics or $H_2S$. This granulate is conveyed to a second rotating filter 8 together with the liquid via the collection tank outlet 32 and the pump 10 that may consist, for example, of a granulate pump, namely in the form of a granulate/gray water mixture that flows through the pipeline 101 and the rotating filter inlet 81.

The second rotating filter 8 again separates the granulate from the liquid. The filtrate now essentially consists of clear water. The granulate is returned into the tank 3 together with the residual liquid via the rotating filter outlet 82 and the line 33. The water at the filter outlet is now delivered to the evaporator 5 in order to obtain highly pure water vapor 51 for the reformer.

The evaporator 5 is supplied via the outlet 83 of the rotating filter 8. The obtained liquid is evaporated in the evaporator 5 in order to separate other substances such as, for example, salts, phosphates and sulfates. Consequently, the salts contained in the water can be retained in the form of residue 52 such that water vapor 51 can be supplied to the reformer via the directional valve 14, the check valve 15, and the line 151. In order to realize this simple processing step, the evaporator 5, for example, may be electrically heated as indicated with the reference symbol 53. Naturally, the energy required for evaporating the liquid may also be obtained from other sources, for example, the waste heat of an on-board fuel cell or the like.

Naturally, the components of the water treatment system shown in FIG. 1 can be connected to one another in different combinations. For example, it would be conceivable to not integrate into the system the second stage that essentially consists of the collection tank 3 and the corresponding supply and discharge lines and serves for binding substances contained in the water. In contrast to FIG. 1, the outlet 73 of the rotating disk filter 7, for example, is directly connected to the inlet 83 of the evaporator 5 for this purpose. The connections may be realized by respective tubes, pipes or hoses. In particular, as shown in FIG. 1a, it is conceivable that the outlet 73 of the rotating disk filter 7 be connected via the line 161 to the inlet 83 of the evaporator 5, or the check valve 16 and the supply line 31 to the collection tank 3. In addition, it would be conceivable to connect several filters in series in order to increase the filter capacity. The throughput could be increased by connecting several filters or collection tanks or evaporators in parallel. A parallel connection of several identical elements also allows a certain redundancy in order to minimize the probability of a complete system failure.

The rotating disk filters 7, 8 shown in FIG. 1 comprise, for example, circular ceramic filter disks that have a hollow interior. This hollow space is open toward a central hollow shaft, through which the liquid can be discharged.

The disks are set in rotation with the aid of a driving motor 9. When sewage is delivered with the aid of a pump 6, the rotating disks cause all solids to be transported outward and the liquid to be transported inward into the hollow spaces of the disks. In this case, the liquid can be withdrawn via the hollow shaft and the thickened substance outside the disks can be transported back into the vacuum tank 2 through the rotating filter outlet 72 from rotating disk filter 7 and back into the collection tank 3 by the rotating filter outlet 82 and the line 33 from rotating disk filter 8.

The granulate needs to be replaced within corresponding service intervals because it is periodically saturated with the solids removed from the water. This is realized, for example, via the service line 34.

The evaporator 5 needs to be flushed in order to achieve a thorough cleaning thereof. The flushing liquid can be disposed of via the directional valve 12 and the lines 54 and 121.

If the water vapor consumption of the reformer drops, the directional valve 14 for the reformer can be closed and the water vapor can be discharged into the atmosphere outside the aircraft. This is indicated with the reference symbol 141. The granulate added to the tank 3 in order to bind the substances in the water advantageously consists of a water-insoluble granulate so as to simplify the separation of the granulate from the water, for example, in the rotating disk filter 8.

FIG. 2 shows a flow chart of a method according to one preferred embodiment of the present invention. In a first step S1, gray water, for example, accumulated on board of an aircraft during its normal operation is stored in a gray water tank. In a second step S2, black water, for example, from on-board toilets, is stored in a vacuum tank. The gray water stored in the first tank can be delivered into the black water tank, for example, on request (step S3). This may take place, for example, once the mixture stored in the vacuum tank or black water tank no longer has a sufficient water content or when the gray water tank is overfilled.

In an ensuing step S4, a certain quantity of the gray water/black water mixture is withdrawn from the vacuum tank with the aid of a pump and delivered to the first rotating filter. The separation of the water and the waste materials contained in the water then takes place in this rotating filter in step S5, wherein the waste materials are returned into the vacuum tank, for example, in the form of a sludge mass. In a sixth step S6, the water is delivered to a collection tank, in which it can be mixed with a granulate or other chemically active substances (step S7) that include, for example, activated carbon and zinc oxide and are able to bind certain substances contained in the liquid, for example, organics or $H_2S$. The granulate/liquid mixture created is then delivered from the collection tank to a second rotating filter with the aid of a pump. The granulate is separated from the water in this second rotating filter in a step S9. The granulate is subsequently returned into the collection tank (step S10).

In a step S11, the multiply filtered water is conveyed to an evaporator that produces water vapor thereof. During this process, other substances contained in the water, e.g., salts, phosphates and sulfates, are retained in the evaporator. These retained substances can be removed from the evaporator at a later time, for example, with the aid of a corresponding suction arrangement (step S12). The water vapor, in contrast, is returned to the on-board system or preferably delivered to a downstream reformer, for example, via a directional valve and a corresponding pipeline with a check valve (step S13). This means that the water circuit within the aircraft is largely closed and large water storage tanks to be regularly refilled by ground personnel can be eliminated.

The realization of the invention is not limited to the preferred embodiment illustrated in the figures. On the contrary, it would be conceivable to realize numerous variations that utilize the described solution and the principle of the invention in embodiments with a basically different design.

In summation, it should be understood that the term "comprising" does not preclude any other elements or steps, and that the terms "one" or "a" do not preclude a plurality of the element referred to. It should also be understood that characteristics or steps that were disclosed in connection with one of the above-described embodiments could also be utilized in combination with other characteristics or steps disclosed in connection with other above-described embodiments. The reference symbols used in the claims should not be understood in a restrictive sense.

The invention claimed is:

1. A water treatment system for an aircraft, comprising:
   a reformer;
   a water supply arrangement for supplying gray water or black water;
   a water treatment arrangement for treating the supplied gray water or black water; and
   a water delivery arrangement including a delivery line configured to communicate with said reformer for delivering the treated gray water or black water;
   wherein the water treatment arrangement comprises a first stage, a second stage and a third stage;
   wherein the first stage comprises a first filter arranged for carrying out a first filtration of the supplied gray water or black water;
   wherein the second stage comprises a collection tank including a granulate;
   wherein the second stage is arranged for binding substances contained in the supplied gray water or black water to said granulate, said granulate including at least a first chemically active substance or a second chemically active substance, the granulate being admixed to the supplied gray water or black water in the collection tank in the second stage;
   wherein the third stage comprises a second filter arranged for carrying out a second filtration for separating the granulate from the supplied gray water or black water and a granulate return line arranged for returning said granulate to said collection tank; and
   wherein the treated gray water or black water delivered by the water delivery arrangement is suitable for use in the reformer.

2. The water treatment system of claim 1,
   wherein the water treatment arrangement or the water delivery arrangement comprises an evaporator; and
   wherein the evaporator is arranged for evaporating water.

3. The water treatment system of claim 2, further comprising
   one of a first valve and a second valve;
   a tubing;
   wherein the tubing is arranged such that the evaporated water generated in the evaporator or a condensate created thereof can be either discharged outboard via the first valve or delivered to the reformer via the second valve.

4. The water treatment system of claim 2, further comprising:
   a tubing and a valve;
   wherein the tubing is arranged such that waste materials remaining in the evaporator are dischargeable via the valve.

5. The water treatment system of claim 4,
   wherein the first stage comprises a first rotating disk filter;
   wherein the first rotating disk filter is arranged to at least partially separate liquid contained in the supplied gray water or black water from residues contained in the supplied gray water or black water; and
   wherein the residues are disposable into a first waste water tank of the water supply arrangement.

6. The water treatment system of claim 1,
   wherein the water supply arrangement comprises a first waste water tank for gray water or black water; and
   wherein the first waste water tank is a vacuum tank.

7. The water treatment system of claim 6,
   wherein the water supply arrangement further comprises a second waste water tank for gray water, a vacuum transport system and an outlet pipe; and
   wherein the gray water stored in the second waste water tank is selectively dischargeable from the second waste water tank into the first waste water tank by means of the vacuum transport system or dischargeable outboard via the outlet pipe.

8. The water treatment system of claim 6, further comprising a valve,
   wherein the valve is arranged such that the first waste water tank can be emptied via the valve.

9. The water treatment system of claim 1, further comprising:
   a separator;
   at least one spray nozzle;
   a vacuum toilet system;
   wherein the water supply arrangement includes the separator and the at least one spray nozzle;
   wherein solids contained in the gray water or the black water are separated in the separator from air that serves as a transport medium of the vacuum toilet system; and
   wherein the at least one spray nozzle is arranged in the separator such that the gray water is introduced into the separator via the at least one spray nozzle to remove deposits from the separator.

10. The water treatment system of claim 1,
    wherein the second chemically active substance includes activated carbon.

11. The water treatment system of claim 10, further comprising
    a check valve;
    wherein the check valve is provided for preventing a back flow of liquid from the collection tank.

12. The water treatment system of claim 11, wherein the check valve is arranged such that liquid from the first stage is directly suppliable to an evaporator.

13. The water treatment system of claim 10, wherein the granulate is water-insoluble.

14. The water treatment system of claim 10, further comprising:
a first rotating disk filter;
an outlet;
wherein the third stage includes the first rotating disk filter and the outlet;
wherein the first rotating disk filter is arranged for at least partially separating water from the collection tank in the third stage; and
wherein the outlet is arranged for discharging water after the at least partial separation.

15. The water treatment system of claim 14, comprising:
a second rotating disk filter; and
a drive;
wherein the drive is provided for driving the first rotating disk filter and the second rotating disk filter.

16. An aircraft with a water treatment system of claim 1.

* * * * *